Figure 1:
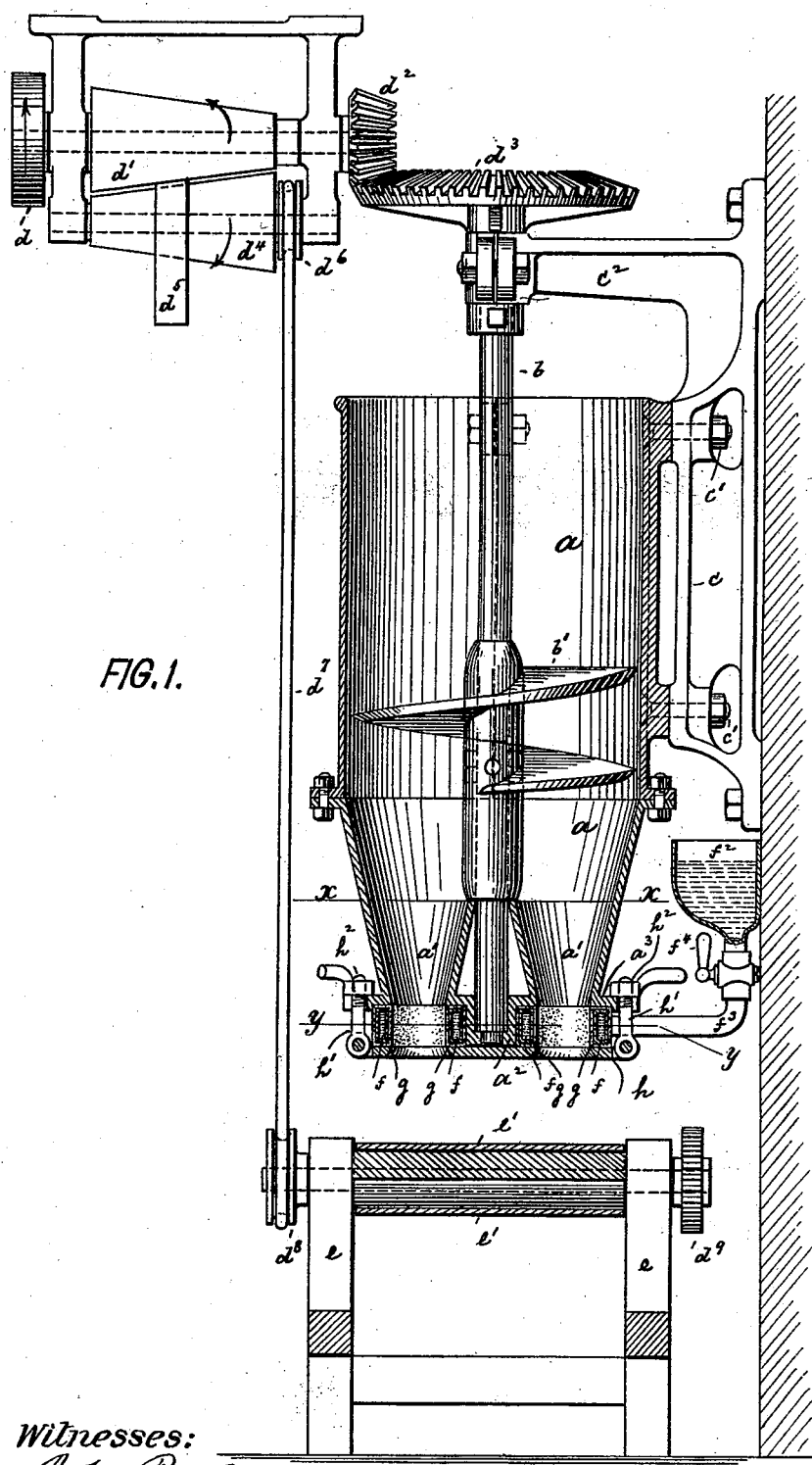

(No Model.) 2 Sheets—Sheet 1.

F. DÜHRKOP.
MACHINE FOR SHAPING DOUGH.

No. 518,942. Patented May 1, 1894.

Witnesses:
John Becker.
Wm. Schulz.

Inventor:
Fritz Dührkop
by his attorneys
Roeder & Briesen

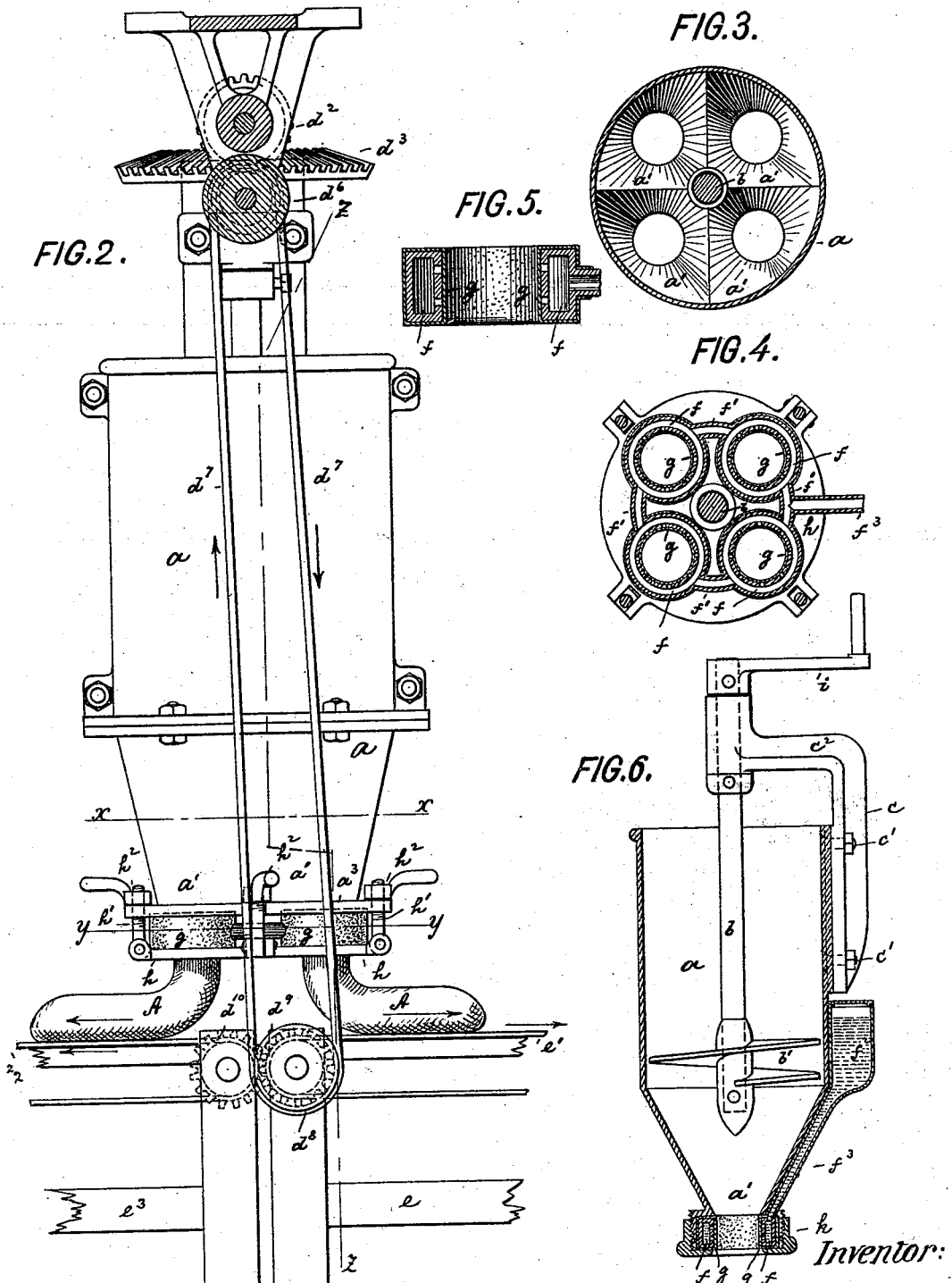

UNITED STATES PATENT OFFICE.

FRITZ DÜHRKOP, OF NEW YORK, N. Y.

MACHINE FOR SHAPING DOUGH.

SPECIFICATION forming part of Letters Patent No. 518,942, dated May 1, 1894.

Application filed January 4, 1894. Serial No. 495,595. (No model.)

*To all whom it may concern:*

Be it known that I, FRITZ DÜHRKOP, of New York city, New York, have invented an Improvement in Machines for Shaping Dough, of which the following is a specification.

This invention relates to a machine for forming fermented dough into cylindrical bodies which are subsequently cut up into the lengths desired for the bread. Thus the laborious process of shaping the dough by hand is dispensed with.

In the accompanying drawings: Figure 1 is a longitudinal section of the machine on line $z, z$, Fig. 2. Fig. 2 is an elevation of the machine; Fig. 3 a cross on line $x, x$, Fig. 1; Fig. 4 a cross section on line $y, y$, Fig. 1; Fig. 5 a vertical section of ring $f$, and Fig. 6 a longitudinal section of a modification of the machine.

The letter $a$, represents the upright cylindrical shell of the machine, preferably composed of two bolted sections, of which the lower section tapers from top to bottom and terminates in four, more or less, nozzles $a'$. Through the shell $a$, extends the shaft $b$, of a conveyer screw $b'$, having preferably about one and a half convolutions. This screw is placed a considerable distance above the top of the nozzles $a'$, so as not to cut the dough before its discharge from the machine. The shell $a$, is secured by bolts $c'$, to a bracket $c$, having an arm $c^2$, that forms the bearing for the upper end of shaft $b$. The lower end of this shaft is journaled in a suitable base plate $a^2$, that connects the nozzles $a'$. The shaft $b$, is driven from power pulley $d$, cone pulley $d'$, and the bevel gear $d^2$, $d^3$, as shown, while the cone pulley $d'$, imparts motion to a second cone pulley $d^4$, by friction strap $d^5$. By shifting this strap, the speed of pulley $d^4$, may be varied in the known manner. The pulley $d^4$, imparts motion by pulley $d^6$, and belt $d^7$, to pulley $d^8$, which operates an endless feed apron $e'$, of a feed table $e$. A similar feed apron $e^2$, on a second table $e^3$, is driven by gear wheel $d^{10}$, intergeared with wheel $d^9$, fast on shaft of wheel $d^8$. The feed aprons $e'$, $e^2$, extend in opposite directions from the center of the machine (Fig. 2), so that the dough is delivered from two nozzles upon one of the aprons, and from the two other nozzles upon the other apron. In this way the two, more or less, cylinders of dough delivered at each side of the machine are properly separated, so as not to interfere.

In order to cause the dough to leave the nozzles in a smooth condition and not to adhere to the machine, each of the nozzles is provided at its discharge end with a hollow ring $f$, perforated at its inner side. The several rings $f$, are connected with each other by means of branches $f'$, while they are connected to a common water supply tank $f^2$, by a pipe $f^3$, having cock $f^4$. Each of the rings $f$, is surrounded by a covering $g$, made of chamois, leather, or similar soft, porous material that constitutes a lining for the ring and that is moistened by the water that percolates through the perforated inner face of the same. I have shown the covering $g$, to extend completely around each ring, as this is the most convenient way of attaching it, but the purposes of the machine will be fulfilled if the covering extends only over the inner perforated face of the ring.

In order to hold the covered ring $f$, in place, I employ a perforated plate $h$, that supports the rings and that has pivoted arms $h'$, adapted to pass through a perforated flange $a^3$, of shell $a$. By tightening up nuts $h^2$, that engage the arms $h'$, the plate $h$, is drawn to any desired extent against the shell $a$.

The operation of the machine will be readily understood. Motion is imparted to shaft $b$, and the feed aprons $e'$, $e^2$, from power pulley $d$, while the cock $f^4$, is opened to convey the water to the rings $f$ and moisten the porous coverings $g$. The dough is thrown into the top of shell $a$, and will by its own weight fall upon the screw $b'$, that forces it out through the nozzles. On passing the soft, moistened coverings $g$, of rings $f$, the dough will be lubricated so that it will not stick or pack, but will leave the machine in a smooth, continuous and homogeneous mass. The cylinders of dough A, that are discharged from the nozzles will be deposited upon the feed aprons which carry them forward, so that they may be cut up into the desired lengths.

In Fig. 6, the construction is the same as already described, excepting that the machine is driven by hand from a crank $i$, and that but a single nozzle and ring are used, the latter being held in place by screw cap $k$.

This modification is, of course, designed for use in bakeries which are conducted on a small scale.

The advantages connected with my machine are that the dough can be shaped rapidly and uniformly. No undue pressure is exerted and the dough will leave the machine in a smooth and well-finished body.

What I claim is—

1. The combination of an upright shell having a downwardly extending discharge nozzle at its lower end, with a vertically hung conveyer screw within the shell, a lubricating ring at the discharge end of the nozzle and a laterally projecting feed apron below the ring, substantially as specified.

2. The combination of a shell having tapering nozzles with a series of perforated rings at the discharge end of said nozzles, surrounding coverings, a clamp plate that supports the rings and arms for connecting the clamp plate to the shell, substantially as specified.

FRITZ DÜHRKOP.

Witnesses:
F. V. BRIESEN,
THEODORE BECKER.